United States Patent Office 3,095,112
Patented June 25, 1963

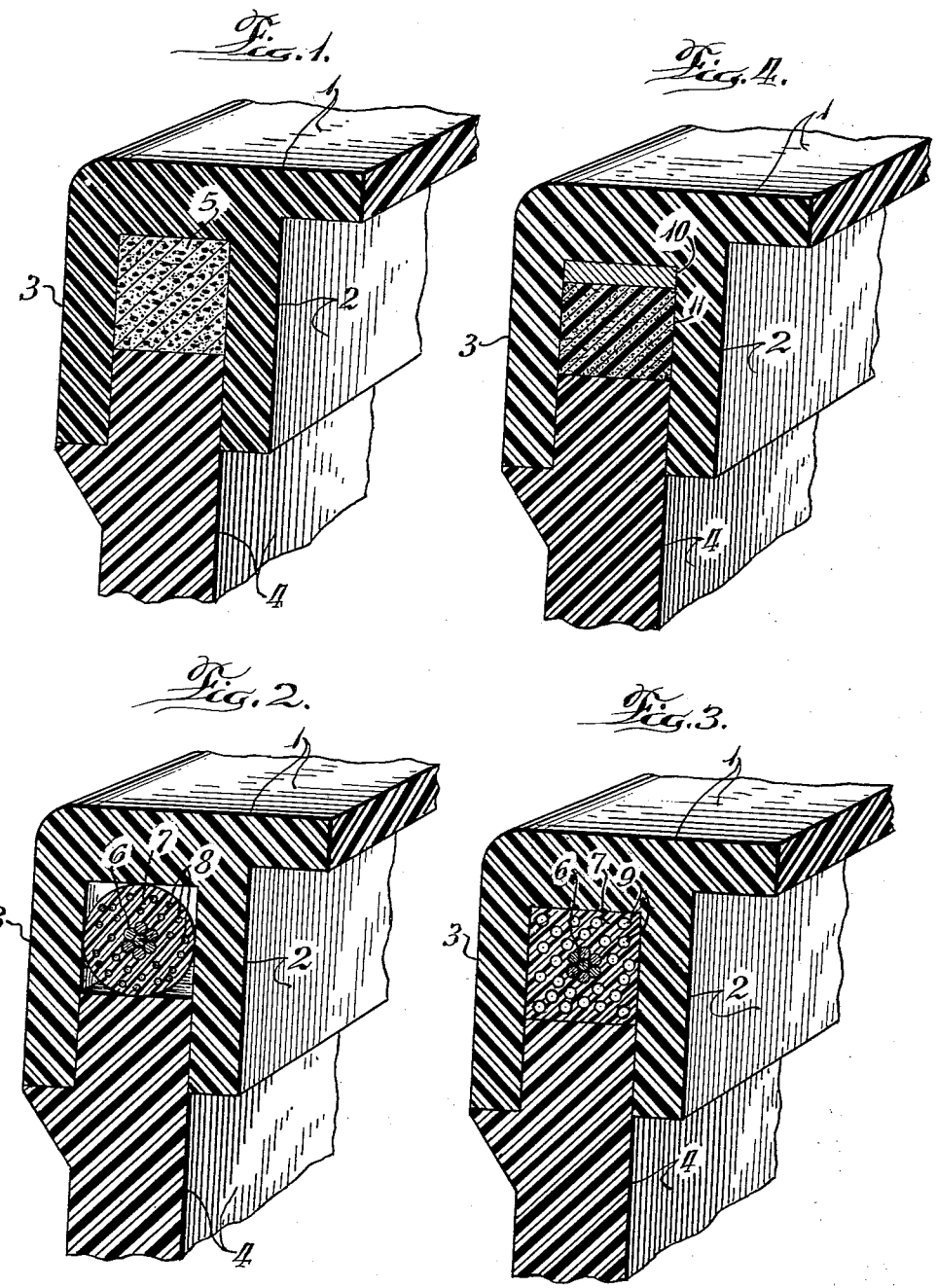

3,095,112
SEALING CONTAINER COVER AND WALL MEMBERS
Meir Weinstein, Chicago, and Howard Primack, Stickney, Ill., assignors to The Richardson Company, Melrose Park, Ill., a corporation of Ohio
Filed Dec. 11, 1961, Ser. No. 158,364
2 Claims. (Cl. 220—67)

This invention relates to a method of sealing the joint between cover and wall members of a container and more particularly relates to a method of making a sealed joint between cover and wall members of a container using electrically generated heat to cause melting of thermoplastic material at the joint to be sealed.

In present day practices where sealing of members is accomplished through the use of thermoplastic materials, the particular material selected is heated in a receptacle and usually poured into place before the members are brought together. This procedure in any of its many forms requires essentially continuous and rather precise heating of the melting pot. In addition, where pouring is the method of application, a wasted excess of thermoplastic sealant is often present. Furthermore, there may be some odor problems from either escaping solvents or volatilized sealant and in the case of bitumens or asphaltic materials an acrid smoke may result. Needless to say, such a method of heating and applying a sealant may require special storage and heating equipment to maintain sufficient material at proper temperature and to avoid smoke and fumes. Where excess sealant is applied an extra step in cleaning up the product must follow. Finally, when sealant is applied in such manner, it may not be properly timed, in which case an unsatisfactory bond results because the material has cooled and set before the parts to be joined have been placed in proper alignment.

Accordingly, it is an object of this invention to provide a method of sealing container components in such a manner as to eliminate the use of excess sealant.

It is a further object of the invention to provide for more accurate heating and control of the heat afterwards until the sealant has hardened to produce a good, readily reproducible bond between the members being joined.

An additional object of the invention is to provide a method of heating sealant in situ at the points to be sealed so as to eliminte vapors, fumes or smoke which might otherwise be harmful or at least troublesome.

These and other related objects are achieved by our invention wherein an electrically conductive element is placed in contact with thermoplastic material located where the two container members are to be joined and sealed. In passing electric current through the conductive element so selected as to produce heat losses, melting of the thermoplastic material permits flow and sealing of the joints by the bond which forms when the current is stopped and the heat is dissipated.

Further description of the invention can be had by making reference to the accompanying drawings using a battery box and cover for illustrative purposes, in which—

FIG. 1 is a cross-sectional view of a cover member with forked or U-shaped edge, a battery case wall member, an electrically conductive element contacting both cover and wall, either one or both of the cover and wall members being fabricated from thermoplastic material.

FIG. 2 is a cross-sectional view of a cover and wall members, not necessarily made of thermoplastic material, and an electrically conductive material coated with thermoplastic material in which a blowing agent is embedded.

FIG. 3 is the same as FIG. 2 after electric current has been passed through the conductive element and the heat loss thereby produced has melted the thermoplastic coating and activated the embedded blowing agent to produce a cellular structure.

FIG. 4 is similar to the cross-sectional view of FIG. 1 except that electrically conductive element in strip form contacts only the cover member, thermoplastic material being separately introduced to contact both cover and wall members, which members in this instance need not be fabricated of thermoplastic material.

Again referring to FIG. 1 for further details, cover 1, with depending legs 2 and 3 forming a channel, is shown in place contacting wall member 4, one or more of these foregoing consisting of thermoplastic material. Conductive element 5, by completely occupying that portion of the U-shaped channel in cover 1, contacts both cover 1 and wall member 4. As current is applied to electrically conductive element 5, power loss within the conductive element generates heat sufficient to produce some melting of the cover 1, legs 2 and 3 and wall member 4. When the current flow stops, the heat content of the melted portions of cover 1 and wall member 4 gradually dissipates at which the melted thermoplastic material reverts to a solid state with resulting fusion of the cover and wall members.

In FIG. 2, cover 1 with legs 2 and 3 is positioned in relation to wall member 4 in the same manner as shown in FIG. 1. Electrically conductive element as stranded wire 6 has a coating 7 of thermoplastic material in which is interspersed a blowing agent 8 in particulate form.

After current has passed through conductive element 6 in FIG. 2, it maintains its relative position within the surrounding coating 7 of thermoplastic material, but that material, by reason of its being heated and by reason of the gas pockets 9 formed by the particulate blowing agent, is expanded as shown in FIG. 3. In expanded form the thermoplastic material tends to fill the volume between cover 1 and wall member 4 and may push or flow into the joints between legs 2 and 3 and wall member 4. The plasticity of the heated thermoplastic material 7 permits expansion of the gas formed by the heated blowing agent, the plasticity, of course, disappearing as the material loses its heat and hardens.

Cover 1 in FIG. 4 contains between legs 2 and 3 electrically conductive element as strip 10 and thermoplastic material 11 which, when heated, forms a bond between legs 2 and 3 and, depending on the amount of heat and degree of flow, will tend to push down between legs 2 and 3 and wall member 4. By indentations or undercuts at opposed positions on legs 2 and 3 and wall member 4, a portion of the thermoplastic material may be pushed down into these indentations to produce a mechanical locking between the cover and wall members that would add to the effect of bonding between the members.

From the foregoing description it can be seen that the process of the invention consists of placing an electrically conductive wire or strip in such a position that heat generated within the wire or strip as converted electrical energy produces some melting of adjacent materials. In positioning the electrically conductive element it may directly contact both members to be sealed together where one or both of these are thermoplastic themselves or it may, in other cases, contact only added thermoplastic material specially positioned to produce the final seal or juncture.

The adhesive and cohesive effects produced during the heating period and persisting after the materials have cooled are the result of both chemical and physical bonding. Such chemical bonding in thermoplastic materials is generally an intermolecular bonding rather than a bonding by reason of chemical reaction that produces a new chemical molecule. The physical bonding is essentially the result of interlacing of molecules and penetration of surfaces which are made possible by greater molecular activity as temperature increases. Upon cooling, of course, the interlacing and surface penetration persist to add to any bonding forces of the chemical category just discussed.

Depending on the physical nature of the materials being joined, any of several methods of applying current to the electrically conductive element may be followed. In certain instances the ends of the conductive element can be brought through to the exterior surface of the container being sealed, and in other cases where a slight breaking or puncturing of the surface of the container would not have any adverse effects, the electrical source can be in the form of a probe whereby the ends of the conductive element within can be reached.

Although a specific configuration of the edges of the cover and wall members has been shown and described, the particular shape or cross-sectional pattern of these members is not a critical concept. For example, where the thermoplastic material can be appropriately confined during heating and cooling the edges to be joined or sealed can be flush and the sealing itself be in the nature of a butt weld. In addition, the dimensions shown in the drawings of the wall and cover members is not proportionate to the dimensions of the electrically conductive strip or wire. Furthermore, the ledge shown in the drawings on wall member 4 is optional, serving no special mechanical function but giving only a smoother exterior surface to the completed container.

Any material which generates sufficient heat through power loss is a satisfactory conductive material for the purposes of this invention. Accordingly, the conductive element can be either metallic, such as copper or Nichrome wire, or non-metallic such as the graphitic materials. Obviously, the better conductors are not necessarily to be sought out for this application since power loss rather than power transmissibility is the basic criterion. Similarly, since size of cross-section of the electrically conductive element affects power loss, no precise size or shape of the conductive material as wire or as strip is critical. Timing the period during which the source of electricity contacts the conductive material will vary, for example, with electrical factors such as voltage and current and physical factors such as resistance of the conductive material including length and cross-sectional dimensions.

To specifically demonstrate the teachings of this invention, the following examples in which polypropylene cover and box were joined and sealed are included:

Example I

Copper wire 34 inches in length and with a diameter of 0.041 inch was jacketed in polyethylene to give both wire and jacket and outside diameter of 0.125 inch. Applying 12 volts D.C. for 10 seconds produced a good bond between polypropylene members.

Example II

Using bare Nichrome alloy strip in direct contact with polypropylene cover and box gave a firm bond between the members with approximately 7 to 10 volts A.C. being applied for 5 seconds. This Nichrome strip was $\frac{1}{32}''$ x 0.0035'' and 34'' long and had measured resistance per foot of 4.77 ohms.

Example III

Using two slabs of polypropylene approximately $\frac{3}{16}''$ thick and a 4'' length of pencil lead 0.081'' in diameter as the conductive material gave a firm bond between the slabs with 20 volts A.C. applied for 10 seconds. Measured resistance for this graphitic conductor was 24 ohms per foot.

When a thermoplastic material is added to serve as the sealant, numerous materials may be used including asphaltics as well as polymeric compositions such as polyethylene, polyvinyl chloride, polystyrene, cellulosics and acrylics, to name a few.

In developing a cellular structure within the thermoplastic material to cause it to expand, the cells are produced and occupied by generally inert gas resulting from entrainment in the thermoplastic material of either certain liquid or thermally-sensitive solid blowing agents, both of which are substantially converted into gas when heated to predeterminable temperatures. The thermally-sensitive blowing agents in general use are those which liberate gases such as nitrogen, carbon dioxide or carbon monoxide. Further detailed description of such blowing agents can be found in the 1962 edition of Modern Plastics Encyclopedia beginning at page 409 where specific reference is made to azo compounds, N-nitroso compounds and sulfonyl hydrazides.

Having thus described our invention, we claim:

1. A method of sealing cover and wall members of a container which comprises passing current through an electrically conductive element in contact with thermoplastic material containing particulate thermally sensitive blowing agent, said thermoplastic material being positioned where cover and wall members are to be sealed whereby the heat generated through power loss in said electrically conductive element causes melting of said thermoplastic material which under gaseous pressure developed by said thermally sensitive blowing agent flows to produce a bond between said members when the current is stopped and the generated heat is dissipated.

2. A container comprising cover and wall members, an electrically conductive element and thermoplastic material containing particulate thermally sensitive blowing agent, said thermoplastic material being a coating on said conductive element which when heated by electrical energy passing through said conductive element flows while heated and under gaseous pressure developed by said thermally sensitive blowing agent to contact both said cover and wall members thereby forming a bond between said cover and wall members when cooled.

References Cited in the file of this patent

UNITED STATES PATENTS

| | | |
|---|---|---|
| 1,369,919 | Eliel | Mar. 1, 1921 |
| 1,818,485 | Lambert | Aug. 11, 1931 |
| 2,741,402 | Sayre | Apr. 10, 1956 |
| 3,047,703 | Aske | July 31, 1962 |